March 18, 1958     F. E. OBERMAIER     2,827,076
PRESSURE COMPENSATING FLOW CONTROL VALVE
Filed April 7, 1954     2 Sheets-Sheet 1

Inventor
Frank E. Obermaier

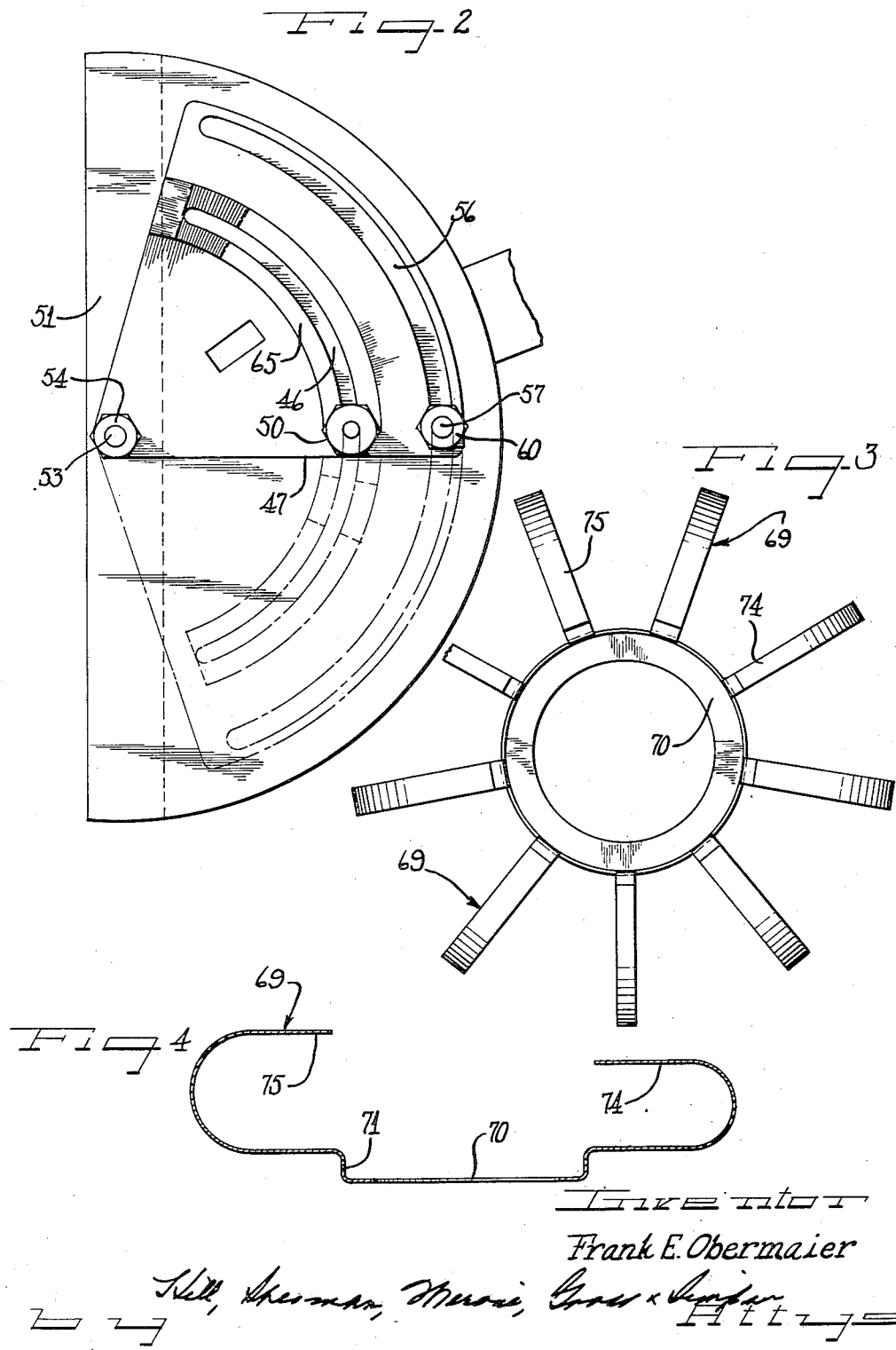

United States Patent Office 2,827,076
Patented Mar. 18, 1958

2,827,076

PRESSURE COMPENSATING FLOW CONTROL VALVE

Frank E. Obermaier, Chicago, Ill., assignor to The Dole Valve Company, Chicago, Ill., a corporation of Illinois Application April 7, 1954, Serial No. 421,576

3 Claims. (Cl. 137—505.13)

This invention relates to improvements in pressure compensated flow control valves for delivering constant volumes of fluid over a wide range of pressure variations.

A principal object of my invention is to provide a novel and improved form of pressure compensated flow control valve so arranged as to deliver a substantially constant volume of fluid over a wide range of pressure variations.

Another and important object of my invention is to provide a pressure compensated flow control valve adjustable for varying the delivery volume of the valve and compensating for variations in pressure, for delivering a substantially constant volume of fluid over a predetermined range of adjustment of the valve and over a wide range of fluctuations in pressure.

A further object of my invention is to provide a novel and improved form of valve controlling the supply of hot water to the heater of an automotive vehicle and compensating for variations in pressure, to provide a uniform selected volume of hot water to the water heater over a wide variation in ranges of pressure, effected by changes in operating conditions of the automotive vehicle.

Still another object of my invention is to provide a novel and improved form of pressure compensating flow control valve for delivering a selected uniform volume of fluid regardless of variations in pressure by providing an adjustable flow control poppet of a predetermined profile, and by providing an annular flow orifice around the poppet and spaced therefrom in all positions of adjustment of the poppet and mounting the flow orifice for movement along the poppet by inlet pressure and balancing the flow orifice by a plurality of springs operating in parallel.

A still further object of my invention is to provide a novel and improved form of flow control valve having a variable annular orifice, in which a selected delivery range is attained by opposing variation in the cross-sectional area of the annular orifice by a plurality of springs successively and cumulatively opposing variation in cross-sectional area of the orifice.

Still another object of my invention is to provide a novel and improved form of flow control valve particularly adapted for supplying hot water to an automotive heater, wherein variations in temperature of the hot water delivered to the heater are reduced to a minimum by controlling the flow of hot water to the heater, wherein the relationship between flow and pressure is substantially a straight line relationship for certain speed ranges and deviates from a straight line relationship for slow and high speed ranges to provide a decrease in flow at low speed ranges and an increase in flow at high speed ranges.

A still further object of my invention is to provide a novel, efficient and simplified form of flow control valve wherein the control of the flow of hot water through the valve is controlled by the pressure of the water acting against a balanced movable orifice member, movable along a converging metering pin of a smaller cross-sectional area than the cross-sectional area of the orifice of the orifice member, for the entire range of movement of the orifice member therealong and within the adjustable range of the metering pin, and by reducing the flow error for any range of adjustment of the poppet and over a wide variation in pressure ranges, by balancing the pressure on the orifice member by a plurality of springs, one being effective over part of the pressure range and the remaining being effective over the remaining part of the pressure range.

These and other objects of my invention will appear from time to time as the following specification proceeds and with reference to the accompanying drawings wherein:

Figure 1 is a transverse sectional view taken through a pressure compensating flow control valve constructed in accordance with my invention and showing the valve in a closed position;

Figure 2 is a top plan view of the valve shown in Figure 1, and showing the adjusting cam for selecting the delivery volume of the valve;

Figure 3 is a fragmentary plan view of the non-linear spring balancing the movable orifice of the valve at increasing rates upon increases in pressure at the inlet; and Figure 4 is a transverse sectional view taken through the spring shown in Figure 3.

In the embodiment of my invention illustrated in the drawings, I have shown in Figure 1 a pressure compensating valve 10 which may be mounted on the cylinder head of an automobile engine to take water from the water jacket of the engine, as in application Serial No. 361,929, filed by Thomas B. Chace on June 16, 1953 and entitled "Heater Systems for Vehicles and Pressure Compensating Control Valves Therefor." It should be understood, however, that the pressure compensating valve of my invention need not necessarily be used with a heating system for an automotive vehicle, but may be used for various flow control purposes.

The pressure compensating valve 10 is shown in Figures 1 and 2 as comprising a casing 11 forming an enclosure for a valve housing 12, having a valve chamber 13 therein. The valve housing 12 is shown as having an upper part 15 of an inverted generally cup-like form with cylindrical walls, and closed by a lower part 16 having a depending inlet 17 leading therefrom and extending through an opening 19 in the bottom of the casing 11.

The lower end portion of the upper part of the housing 15 is shown as having an outwardly spaced wall or flange portion 20 abutted by an annular flanged rim 21 of a diaphragm 23. The diaphragm 23 is shown as being held in engagement with the inside of the outwardly spaced flanged portion 20 by means of an upset or upstanding annular ridge 24 of the lower cover part 16 of the housing engaging the inside of the rim 21 of said diaphragm, and by an outer annular flanged portion 22 of said cover engaging the underside of said rim 21 of the diaphragm 23, and held in engagement therewith by an outer rim 25 which may be spun upwardly along and inwardly of the outwardly spaced flange 20 of the housing part 15.

The inlet 17 is also shown as having a reduced diameter member 26 therein seated within said inlet. The member 26 may be engaged by the lower end portion of a metering pin 27 to block the flow of hot water into the valve chamber 13 if desired.

The metering pin 27 is shown as being slidably guided in a depending cylindrical guide 29, depending within the chamber 13 from the top of the valve housing 12, and guiding the metering pin for adjustable movement within an annular orifice member 30 having an orifice 31 leading therethrough in axial alignment with the metering pin 27. The orifice member 30 may be made from metal or any other rigid material and is shown as being recessed within a thickened annular central portion 32 of the diaphragm 23, and as forming a diaphragm plate therefor. The orifice member 30 is moved along the metering pin 27 in accordance with the pressure of water entering the inlet 17 and acting on the upstream side of said diaphragm 23. The orifice 31 of the orifice member 30 is shown as encircling the metering pin 27, and as spaced from said metering pin in all positions of movement of the orifice member 30 along said metering pin and within the range of adjustment of the metering pin 27 along the guide member 29.

The guide member 29 is shown as having a flanged upper portion 33 abutting the underside of an annular top 34 for the upper housing portion 15 of the casing 12. The flange 33 is shown as abutting the underportion of a sealing sleeve 35, and as holding an annular rim 36 of said sealing sleeve into engagement with a downwardly facing annular recess 37 of the top 34 of the upper housing portion 15. The flange 33 may be suitably secured to the underportion of the top 34 as by welding or by any other securing means. The sealing sleeve 35 is shown as extending upwardly along the inner side of the opening through the top 34 of the upper housing portion 15 and thence downwardly along a plug 39 connected to the upper end of the metering pin 27. The plug 39 is shown as having a depending threaded rod 40, threaded within the upper end portion of the metering pin 27 in axial alignment with the axis thereof. The lower end portion of the sealing sleeve 35 is shown as having an inwardly extending flanged portion 41, recessed within an annular groove 42 formed in the top face of the metering pin 27 and held in engagement therewith by the bottom of the plug 39, so as to provide a water-tight seal around said plug and the central opening in the top 34 of the upper housing portion 15 around the plug 39.

The upper portion of the plug 39 is shown as being of a generally hexagonal formation as indicated by reference character 43, to accommodate a wrench to tighten the threaded rod 40 in the metering pin 27. The plug 39 also has a semi-spherical upper end portion 44, from which extends a stem 45 slidably guided in a slot 46 formed in a cam sector 47. The stem 45 is joined at its upper end by a semi-spherical lower portion 49 depending from a hex head 50 and facing the semi-spherical portion 44.

The cam sector 47 is shown as being pivoted to an outwardly extending flange 51 extending horizontally outwardly from the rear wall of the casing 11. As herein shown, a machine screw 53 having a nut 54 threaded thereon and abutting the top surface of the cam sector 47 forms a pivot for said cam sector. Tension is shown as being applied to the nut 54 to enable the cam sector 47 to remain in position by means of a spring washer 55. The cam sector 47 is shown as extending along the top of the casing 11 and as having an arcuate slot 56 formed therein and extending therealong, adjacent its outer margin. The slot 56 is guided along a machine screw 57 extending through an inwardly extending top surface 59 of the casing 11. A nut 60 is threaded on the upper end of the machine screw 57 and abuts the upper surface of the cam sector 47. Frictional resistance between the nut 60 and the cam sector 47 is shown as being maintained by a spring washer 61. The cam sector 47 is also shown as having a depending ear 63, to which may be attached a Bowden wire (not shown) or the like, which may be operated from the dashboard of the automotive vehicle, for pivoting the cam sector 47 to vary the position of the metering pin 37 with respect to the orifice 31 and thus vary the flow area of said orifice.

The cam sector 47 also has an upwardly inclined cam face 65 having the slot 46 for the stem 45 extending along in the form of an arc struck from the center of the bolt 53. Thus, on pivotal movement of the cam sector 47 toward the metering pin 27, the stem 45 and spherical face 47 will move upwardly along the slot 46 in the cam surface 65, and first raise the metering pin along the guide 29 out of engagement with the seat 26, and open the inlet 17 and then move upwardly within the orifice 31 and increase the cross-sectional area of the annular orifice formed between the inner periphery of the orifice member 31 and the profile of the metering pin 27, to increase the delivery rate of the valve as selected.

The profile of the metering pin 27 at the metering end thereof uniformly converges toward the longitudinal axis of said metering pin, and the curve of the poppet may be a semi-log curve, that is, a curve plotted on semi-log paper one coordinate of which is logarithmic and the other coordinate of which is uniformly divided. The slope of the curve is determined by the travel of the orifice 31 over the range of pressure that the valve is designed to operate. The delivery volume of the valve for any selected position of said metering pin will thus be substantially uniform throughout a wide range of pressures, tending to move the diaphragm 23 and orifice 31 along said metering pin in a direction away from the inlet 17.

The pressure of fluid acting on the diaphragm 23 from the inlet 17 is shown as being balanced by a spring 69. The spring 69 is so proportioned and loaded in relation to inlet pressure on the diaphragm 23 as to provide a substantially constant rate of flow for any position of adjustment of the metering pin 27, and throughout the entire range of movement of the orifice 31 along said metering pin, for a selected range of pressures to which the diaphragm is subjected.

The spring 69 is shown as being a leaf type of spring, which may be made from beryllium copper or any other suitable spring material, and has a central annular rim 70, shown as being seated on the orifice member 30, with a generally cylindrical portion 71 extending upwardly therefrom along the inner margins of the diaphragm 23. The spring also has a plurality of spring fingers 74 and 75, shown as extending generally radially outwardly from the flange 71 and as being curved inwardly toward said flange. The spring finger 74 is shown as curving about a smaller radius of curvature than the spring finger 75 and as having a lesser cross-sectional area than the spring finger 75, said spring finger 74, however need not be of a lesser cross-sectional area but is designed to suit the required pressure conditions.

The spring fingers 75 and 74 are adapted to successively abut or engage the undersurface of an annular abutment flange 76, extending outwardly from the cylindrical guide 29 adjacent the lower end thereof.

A stop 77 depends from the guide member 29 and engages the orifice member 30 to limit travel thereof and serve as a means to effect the supply of an increasing delivery volume of hot water at high speeds of travel of the vehicle, where the valve may be used in a heater system, to compensate for the increased air leakage and decreasing temperature of the cooling water due to the increase in circulation thereof through the cooling radiator.

It should also be understood that for slow speeds of the vehicle up to about fifteen or twenty miles per hour it is desired that the volume of water supplied to the heater by the valve 10 be reduced from the uniform volume delivered over the intermediate ranges of speed, to compensate for the reduced air leakage through the vehicle body due to the decrease in speed of the vehicle. The characteristics of the valve of my invention are such that this is attained when the pressures are below the pressure range for which the valve is designed to maintain a uniform delivery volume.

It should further be understood that additional spring fingers or springs may be provided to come into action after the spring fingers 74 and 75, to add to the resistance to movement of the diaphragm 23 and orifice member 30 as the pressures increase above a predetermined range, to take the place of the stop 77. The delivery volume of the valve at high engine speeds may thus increase over the predetermined uniform delivery volume desired, by varying the spring pressure exerted against the diaphragm up to a spring pressure, the equivalent of a solid stop for maximum delivery volume conditions, at extremely high speeds.

It may be seen from Figure 1 that when the metering pin 27 is moved out of engagement with the seat member 26 and inlet fluid under pressure flows through the annular orifice formed between the orifice 31 and profile of said metering pin, that the pressure of the fluid will tend to move the diaphragm 23 and orifice 31 axially along the metering pin 27 toward the stop 70. The spring fingers 75 will thus first come into engagement with the shoulder or flange 76 and balance the pressure acting against the diaphragm 23, and will thus act at one pressure range to oppose movement of the diaphragm 23 and orifice 31 along the metering pin 27, to reduce the cross-sectional area of the annular orifice around said metering pin as the inlet pressure increases and assure a substantially constant delivery volume of fluid through the outlet 66. As the pressure range increases further, the spring fingers 74, 74 will then come into engagement with the undersurface of the annular abutment flange 76, to balance the pressure of fluid acting against the diaphragm 23. The two sets of spring fingers 74 and 75 are then effective over the remaining portion of the pressure range and act cumulatively to provide a substantially constant flow of fluid through the outlet 66 over a wide range of pressures for any selected setting of the metering pin 27 and delivery volume of the valve.

The spring fingers 74 and 75 thus form a series of springs in parallel, and while the spring fingers as herein shown are so arranged as to give the effect of two springs in parallel when the two springs are effective, it is readily understandable that any number and strength of spring fingers desired may be provided, to give the effect of an infinite number of springs in parallel where it is required that the accuracy of the flow be increased, or that the errors due to improper balancing of the diaphragm 23 at intermediate points of the pressure range be decreased.

It may be seen from the foregoing that I have provided a novel and improved form of pressure compensating flow control valve in which the errors in delivery volume at intermediate points of the pressure range are reduced by balancing the movable orifice against the inlet pressure acting thereon by a plurality of springs acting in parallel so that one spring may be effective over a part of the pressure range and all of the springs may be effective over the remaining part of the pressure range.

It may further be seen that the accuracy in the flow control is attained not only by the springs arranged in parallel, but also by the cooperation of the movable orifice member along the metering pin, the profile of which is formed to decrease the annular flow orifice between said metering pin and the rigid movable orifice member 31 as the pressures increase.

It will be understood that modifications and variations may be effected without departing from the scope of the novel concepts of the present invention.

I claim as my invention:

1. In a pressure compensating flow control valve particularly adapted for controlling the flow of hot water to a hot water heater for an automotive vehicle, a casing having an inlet and an outlet, a metering pin extending within said casing and mounted for movement therealong toward and from said inlet, an orifice member movably mounted within said casing and having a rigid orifice in axial alignment with said metering pin and encircling the same and movable along said metering pin by the pressure of inlet fluid acting on said orifice member, said orifice being free from said metering pin for the entire range of travel of said orifice member along said metering pin, and means loaded to provide an increasing rate of balancing pressure on said orifice member for increasing pressure ranges of fluid entering said valve through said inlet comprising an annular rim seated on said orifice member and having a plurality of radial spring fingers extending outward therefrom and curved inwardly toward said rim in spaced relation with respect thereto for engagement with said casing and forming a plurality of springs arranged in parallel and successively balancing said orifice member.

2. In a pressure compensating flow control valve particularly adapted for controlling the flow of hot water to a hot water heater for an automotive vehicle, a casing having an inlet and an outlet, a metering pin extending within said casing, a guide for said metering pin within said casing, guiding said metering pin for movement along said casing toward and from said inlet, said metering pin having a profile of reducing diameter toward one end thereof, an orifice member extending across said casing and movably mounted therein and having a rigid orifice in axial alignment with said metering pin and encircling the same and spaced therefrom for the entire range of adjustment of said metering pin along said orifice member, and means loaded to provide an increasing rate of pressure, opposing movement of said orifice member along said metering pin as the pressure of fluid entering said chamber through said inlet increases, and comprising spring means encircling said orifice member and seated thereon and having an annular rim seated on said orifice member and a plurality of spring leaves extending radially outwardly therefrom and curving inwardly toward said rim in spaced relation with respect thereto and coming into engagement with said guide as the pressure of fluid entering said casing through said inlet increases.

3. In a pressure compensating flow control valve, a casing having an inlet and an outlet, a metering pin adjustably mounted within said casing in axial alignment with said inlet, a guide for said metering pin, means for adjustably moving said metering pin along said guide toward and from said inlet, a diaphragm extending across said casing and having a rigid orifice member therein having an orifice in axial alignment with said inlet and movable along and spaced radially from said metering pin for the entire range of adjustment of said metering pin, said metering pin having a metering profile of reducing diameter toward said inlet, to form with said orifice an annular orifice of decreasing cross-sectional area, as said orifice moves away from said inlet, and nonlinear spring means balancing the pressure of inlet fluid tending to move said diaphragm along said metering pin and comprising an annular rim seated on said orifice member and having a plurality of leaf spring fingers extending radially outwardly therefrom and curved inwardly toward said rim in spaced relation with respect thereto and opposing movement of said orifice member along said metering pin at different phases of movement of said orifice along said metering pin, some of said leaf spring fingers coming into engagement with said guide and acting to balance said diaphragm at one pressure range and other of said leaf spring fingers coming into engagement with said guide and acting to balance said diaphragm at a greater pressure range and adding to the balancing pressure of said first mentioned leaf spring fingers.

References Cited in the file of this patent

UNITED STATES PATENTS

| 1,199,152 | Bruce | Sept. 26, 1916 |
| 1,519,856 | Lorraine | Dec. 16, 1924 |
| 2,127,521 | Kemp | Aug. 23, 1938 |
| 2,684,081 | Chase | July 20, 1954 |

FOREIGN PATENTS

| 561,402 | Germany | of 1928 |